Patented Jan. 5, 1943

2,307,466

UNITED STATES PATENT OFFICE 2,307,466

MAGNESIUM OXIDE HOT PROCESS FOR SILICA REMOVAL FROM WATER

Charles A. Noll and John J. Maguire, Philadelphia, Pa., assignors to W. H. & L. D. Betz, Philadelphia, Pa., a firm composed of William H. Betz and L. Drew Betz No Drawing. Application September 6, 1939, Serial No. 293,570

3 Claims. (Cl. 210—23)

This invention relates particularly to a process for treating and purifying natural waters, and relates more especially to the treatment of such waters as contain silica and/or its compounds, such waters being distinguished from brines in which the silica, together with other impurities, is present and is removed therefrom, as a preliminary step to the recovery of other substances such as sodium chloride, sodium sulphate, sodium carbonate, sodium borate, and potassium chloride, as distinguished from directly preparing a natural water for use in boilers, or for other industrial purposes. Thus, natural water and brines, such as are obtained from salt lakes and wells, are uniformly considered as comprising two entirely different raw materials, substances or liquids. By way of further comparison, such natural waters as are intended to be used for industrial purposes rarely contain more than 0.1% total solids (equivalent to 1,000 P. P. M.), whereas in brine there is commonly as much as 40.0% to 50.0% or even more of suspended and dissolved solids and other impurities, and at least as much as 0.3% of silica alone (equivalent to 3,000 P. P. M. or more).

It is to be noted that the present process is applicable to the treatment of water for drinking purposes, but at present it is designed more for use in the treatment of water for industrial purposes and particularly for use as boiler feedwater. In the last-mentioned use, the removal of silica before the water enters a boiler is for the purpose of preventing such silica from otherwise being deposited as silicate scale, as such a deposit in boilers operating at the high temperatures, corresponding with pressures of 200 lbs. per sq. inch and over, produce a water insoluble scale (usually including also calcium or magnesium) which is so dense, even vitreous-like, that it is difficult to remove when once deposited. Heretofore it has been customary to soften the natural hard water before it is injected into a boiler, thereby removing whatever calcium and magnesium may be present, but without substantially reducing the silica content of the water, whereupon this silica either alone or in combination with any residual calcium or magnesium present, inevitably forms the flint-like scale hereinbefore referred to.

In order to eliminate the silica from natural water, various methods have heretofore been devised, but heretofore with only partial commercial success, due to the introduction of high dissolved solids in the treated water, and the excessive quantities of treating materials required. The residual silica even after the most diligent efforts to date, still forms a degree of impervious scale such as is extremely costly in boiler maintenance. Among such efforts are those which comprise the use of salts of cadmium, manganese or zinc combined with an alkali; ferrous, ferric and zinc hydroxides; and similar reagents. However, after many years of research upon the subject, none of them offers results approaching those hereinafter described, and as illustrated by the tables incorporated herein.

An object of the invention, therefore, is to provide a process for the economical and efficient removal of silica from heated natural water, as for instance under the conditions met with in the widely used hot-process industrial water softeners, in which the water is normally maintained at approximately 95° C. This process is characterized by the high degree of silica removal within a relatively short space of time, and the fact that it can be used either with the common lime-soda process of water softening, or entirely independently thereof.

More specifically, the preferred form of the process comprises the use of magnesium oxide either alone, or in combination with sodium hydroxide, or concurrently instead with the common soda-lime process, while within certain limits magnesium carbonate can be substituted for the magnesium oxide under practically the same conditions. It is also to be noted that in the improved process, which is hereinafter described in detail, any mention of sodium hydroxide is intended to apply as well to sodium carbonate, calcium hydroxide and other alkaline salts, which by test are found to similarly function with magnesium oxide or magnesium carbonate.

REMOVAL OF SILICA AS THE RESULT OF VARYING PROPORTIONS OF MAGNESIUM OXIDE

In order to illustrate the results obtained by the use of various proportions of magnesium oxide with a fixed quantity of sodium hydroxide in treating water at approximately 95° C., reference is had to the accompanying Table I:

TABLE I

Conditions:
 1 liter samples of water with a silica concentration of 42 P. P. M., as $SiO_2$
 Temperature 95° C.
 15 minutes retention and stirring time
 40 P. P. M. sodium hydroxide added

| Magnesium oxide added grams | $SiO_2$ remaining in solution | $SiO_2$ removed | Percentage $SiO_2$ removed |
|---|---|---|---|
| | P. P. M. | P. P. M. | |
| 0.30 | 0.1 | 41.9 | 99.9 |
| 0.25 | 1.0 | 41 | 97.5 |
| 0.20 | 3.0 | 39 | 93 |
| 0.15 | 8.0 | 34 | 81 |
| 0.10 | 18 | 24 | 57 |

From this table, it will be noted that with an initial silica concentration in the water of 42 P. P. M. at a temperature of 95° C., with 40 P. P. M. sodium hydroxide added and 15 minutes retention and stirring time, a mere 0.1 gram magnesium oxide, equivalent to 100 P. P. M., reduced the silica to 18 P. P. M., while an increase in the magnesium oxide to 0.3 gram effected a further reduction in the silica to only 0.1 P. P. M., or in other words a removal efficiency of 99.9.%

Effect of temperature

It has been found that an increase in temperature results in an increase in the efficiency of the reaction, and in the consequent removal of silica from water by means of magnesium oxide in the presence of a fixed proportion of sodium hydroxide, as indicated by the accompanying Table II:

TABLE II

Analysis of original sample:

|  | P. P. M. |
|---|---|
| Hardness as $CaCO_3$ | 36 |
| P alkalinity as $CaCO_3$[1] | 0 |
| M alkalinity as $CaCO_3$[2] | 26 |
| Silica as $SiO_2$ | 22 |

Conditions:
 15 minutes retention and stirring time
 0.1 gram magnesium oxide added
 40 P. P. M. sodium hydroxide added
 1 liter samples of water

[1] P alkalinity is the titratable alkalinity to the phenolphthalein colorless end point (pH 8.3).
[2] M alkalinity is the titratable alkalinity to the methyl orange salmon colored end point (pH 4.3).

| Temperature ° centigrade | Analysis of treated water in P. P. M. | | | |
|---|---|---|---|---|
| | Hardness as $CaCO_3$ | P alkalinity as $CaCO_3$ | M alkalinity as $CaCO_3$ | Silica as $SiO_2$ |
| 30 | 88 | 76 | 108 | 16 |
| 50 | 72 | 60 | 100 | 8 |
| 70 | 60 | 48 | 92 | 3 |
| 95 | 28 | 32 | 68 | 1 |

From this table it will be noted that with a relatively low water temperature, such as that which is found in an ordinary boiler room, the initial silica content of 22 P. P. M. with 0.1 gram magnesium oxide and 40 P. P. M. sodium hydroxide, under 15 minutes retention and stirring time, is reduced only to 16 P. P. M. As the temperature is increased, while all other factors remain the same, it will be seen that at 95° C., the silica was reduced to a mere 1 P. P. M. It is also interesting to note that with an increase in temperature, other factors being equal, the hardness of the water as calcium carbonate is decreased from 88 to 28 P. P. M., while the alkalinity is similarly reduced, both of which factors relating to hardness and alkalinity are of prime importance in the conditioning of water for industrial purposes. As the temperature of approximately 95° C., is substantially the same as that which is ordinarily maintained in hot-process water softeners, it will be apparent that a high degree of efficiency of the process can be expected, when using the same for silica removal in such softeners concurrently with the so-called lime-soda process. It should also be understood that, when mention is hereinafter made to 95° C., such expression is intended to represent the entire temperature range at which the process operates adjacent to the boiling point and as low as approximately 75° C.

Additional tests were made with temperatures of 23° C., but at such low temperature, it was found impossible to obtain results in any way approximating those obtained with the higher temperatures noted in Table II, even when increasing the magnesium oxide to 0.3 gram and the stirring and retention time to as much as 180 minutes (3 hours), as compared with the 15 minutes retention and stirring time used in each of the comparative tests shown in Table II. In fact, with a temperature as low as 23° C., and 15 minutes retention and stirring time, the silica content is reduced from 22 P. P. M only to 19 P. P. M., and under the same conditions the silica is reduced to a minimum of 10 P. P. M., only after 180 minutes retention and stirring time, while the hardness of the water following the treatment rises to considerably over 100 P. P. M. as calcium carbonate, compared with the mere 28 P. P. M. at 95° C., thus developing a further disadvantageous factor when using a low temperature.

EFFECT OF VARYING PROPORTIONS OF SODIUM HYDROXIDE

From the accompanying Table III, the results will be apparent when using various proportions of sodium hydroxide with a substantially fixed proportion of magnesium oxide, while this table also indicates the definite need for controlling the alkalinity of the water. To illustrate more specifically, with no sodium hydroxide, but 0.2 gram magnesium oxide added, the silica is reduced from 22 P. P. M. to 16 P. P. M., while upon using substantially the same proportion of magnesium oxide, i. e., 0.3 gram, but adding 20 P. P. M., sodium hydroxide, there is a sharp diminution in the silica to a mere 1.5 P. P. M., and this is only slightly further reduced to 1.0 P. P. M. by doubling the quantity of sodium hydroxide. However, while the alkalinity has thus far been maintained within reasonable limits, an increase of sodium hydroxide to 100 P. P. M. effects a considerable decrease in the hardness of the water, but with the sharp increase in alkalinity there is a pronounced decrease in the efficiency of the silica removal, so that there is under such conditions 3.0 P. P. M. remaining silica, thereby showing that too much sodium hydroxide tends to retard or inhibit the full action otherwise of the magnesium oxide. It should be added that by increasing the sodium hydroxide to the neighborhood of 40 P. P. M., and the magnesium oxide to approximately 0.3 gram, this process also serves in lieu of the lime-soda process, while simultaneously operating at high efficiency in the removal of silica. The facts illustrated by Table III further indicate very definitely the need for control of the alkalinity of the treated water, as unduly high alkalinity results in retaining a certain proportion of the silica in solution. It is also to be noted that when using no sodium hydroxide, the hardness of the water was immediately increased from 40 P. P. M. to 76 P. P. M., while presence of substantial quantities of sodium hydroxide reduced the hardness below that of the water in its original condition.

TABLE III

Analysis of original sample:

| | P. P. M. |
|---|---|
| Hardness as $CaCO_3$ | 40 |
| P alkalinity as $CaCO_3$ | 0 |
| M alkalinity as $CaCO_3$ | 28 |
| Silica as $SiO_2$ | 22 |

Conditions:
- 3 liter samples of raw water
- Temperature—95° C.
- 15 minutes stirring and retention time

| Sodium hydroxide added P. P. M. | Magnesium oxide added | Analysis of treated water ||||
|---|---|---|---|---|---|
| | | Hardness as $CaCO_3$ | P Alkalinity as $CaCO_3$ | M Alkalinity as $CaCO_3$ | Silica as $SiO_2$ |
| | Grams | P. P. M. | P. P. M. | P. P. M. | P. P. M. |
| 0 | 0.2 | 76 | 20 | 48 | 16 |
| 20 | 0.3 | 56 | 32 | 64 | 1.5 |
| 40 | 0.3 | 34 | 40 | 72 | 1.0 |
| 100 | 0.3 | 10 | 84 | 124 | 3.0 |

USE OF THE PROCESS WITH HOT LIME-SODA SOFTENING

As hereinbefore mentioned, the removal of silica primarily by means of magnesium oxide can be carried out concurrently with and in the same container or softener, in which water for industrial purposes is softened by means of the well-known hot lime and soda ash process. Thus, the removal of silica by magnesium oxide can proceed simultaneously with the removal of hardness from the water, as illustrated by Table IV.

TABLE IV

Effect of magnesium oxide in removal of silica in conjunction with hot process lime and soda softening Conditions:
- 1 liter samples of water;
- Temperature—95° C.

From this table, it will be noted that the original hardness as calcium carbonate was 124 P. P. M., and the silica 20 P. P. M. Mere softening of the water by means of the lime-soda process at 95° C. effected the usual characteristic reduction in silica to 19 P. P. M., and the hardness to 38 P. P. M. during a retention time of 15 minutes. By adding 0.1 gram magnesium oxide and without the aid of sodium hydroxide, the silica was sharply reduced to but 1.0 P. P. M., and the hardness to 32 P. P. M., and these results remain the same, even by increasing the retention time from 15 minutes to 60 minutes. By adding first 20 P. P. M., and then 40 P. P. M. of sodium hydroxide, the hardness was substantially further reduced, but with a sharp increase in alkalinity the efficiency of the silica removal was lessened, which was consistent with the results shown in Table III. In the last two columns of Table IV a 50% increase in magnesium oxide to 0.15 gram, both with 15 minutes and 60 minutes retention times, the silica removal was further increased to a net result of something less than 1.0 P. P. M.

The effect of higher alkalinities could have been attained by using either lime or soda ash in the tests represented by Table IV, but sodium hydroxide was employed for convenience in conducting the tests, wherefore and for such purpose the lime and/or soda ash are considered substitutes for the sodium hydroxide and vice versa. As is well known, high alkalinity in treated water is exceedingly undesirable for industrial purposes, and especially in the case of boiler feedwater, which fact further indicates the need for control in the present process of the quantity of magnesium oxide, both alone and when used with other alkalies for silica removal, in order that the most efficient results may be obtained.

CONTROL

Control of the present process is of paramount importance as is clearly shown by an examination of the accompanying tables, for if the process is not properly controlled within fairly critical limits, a substantial addition to the solid content of the water will be effected, and this, as is well known, is undesirable, especially in the treatment of boiler feedwater, and only to a slightly less degree in other types of water for industrial purposes. The same tables also show that a proper chemical balance must be maintained in the treated water, as otherwise increased hardness of the treated water will almost invariably result, while on the other hand, if the alkalinity of the treated water is permitted to rise too high, a decrease in the efficiency of the silica removal results, in addition to an undesirable degree of increase in the solids content and total alkalinity. The factor of temperature control has already been mentioned as playing an important part in the efficiency of the present process, for a high temperature of approximately 95° C., in addition to increasing the efficiency of silica removal, concurrently tends to decrease the hardness of the water and also its alkalinity, with the further desirable result of a decrease in the solids content.

It has furthermore been found that as a matter of control it is necessary in order to obtain proper efficiency of silica removal to proportion the magnesium dry to the water to be treated. If magnesium oxide is simply mixed into a slurry in a chemical mixing tank with water, it hydrolyzes to

| | Original sample | (1) | Test No. 1 | Test No. 2 | Test No. 3 | Test No. 4 | Test No. 5 | Test No. 6 | Test No. 7 |
|---|---|---|---|---|---|---|---|---|---|
| Hardness as $CaCO_3$ in P.P.M. | 124 | 38 | 32 | 32 | 20 | 20 | 6 | 34 | 34 |
| P alkalinity as $CaCO_3$ in P.P.M. | 0 | 36 | 26 | 22 | 52 | 32 | 62 | 24 | 22 |
| M alkalinity as $CaCO_3$ in P.P.M. | 6 | 64 | 54 | 36 | 84 | 82 | 96 | 60 | 64 |
| Silica as $SiO_2$ in P.P.M. | 20 | 19 | 1.0 | 1.0 | 2.5 | 2.0 | 3.0 | 0.0 to 1.0 | 0.0 to 1.0 |
| Magnesium oxide in grams | | | 0.1 | 0.1 | 0.1 | 0.1 | 0.1 | 0.15 | 0.15 |
| Sodium hydroxide in P.P.M. | | | | | 20 | 20 | 40 | | |
| Retention time in minutes | | 15 | 15 | 60 | 15 | 60 | 15 | 15 | 60 |

[1] Hot process lime and soda treatment alone.

magnesium hydroxide. Once in this form, if then added from the chemical mixing tank to the water to be treated, silica removal will not be effected, since magnesium hydroxide formed externally and added to water will not remove silica. It has been found that the addition of magnesium oxide to water in a chemical mixing tank requires approximately one-half hour for the hydrolysis, so that if the magnesium oxide remains in contact with the water in the chemical mixing tank for a period of time greater than one-half hour, and the mixture is then fed to the water to be treated, a proper efficiency for silica removal will not be obtained.

Magnesium oxide can not be mixed into water with an alkali such as calcium oxide, sodium hydroxide, or sodium carbonate, without the immediate precipitation of magnesium hydroxide, and magnesium hydroxide which is formed externally to the water to be treated is, as herein noted, inefficient for the removal of silica. There is no such delay of one-half hour in the formation of magnesium hydroxide, when the magnesium oxide is added to the water in the presence of an alkali, since the magnesium hydroxide forms immediately.

In order, therefore, to obtain precipitation of magnesium hydroxide in situ, it is necessary that the magnesium oxide be proportioned dry, and fed dry either to the water to be treated, or into a stream of water where a retention time of less than one-half hour has been provided, before introduction by means of such stream into the water to be actually treated for silica removal.

EFFICIENCY OF VARIOUS FORMS OF MAGNESIUM OXIDE

By comparing magnesium oxide from various sources, it has been found that there is a wide difference in the physical as well as the chemical characteristics of the magnesia and magnesite, as shown by the accompanying Table V:

TABLE V

|  | Lbs./cu. ft. | Turbidity as $SiO_2$ P.P.M. |
|---|---|---|
| U. S. P. light magnesium oxide | 16.0 | 200 |
| ² Commercial magnesia (source A) | 17.7 | 216 |
| ² Commercial magnesia (source B) | 21.2 | 200 |
| Technical magnesium oxide | 24.7 | 100 |
| ² Commercial magnesia (source C) | 27.8 | 144 |
| ² Commercial magnesia (source D) | 29.3 | 134 |
| U. S. P. heavy magnesium oxide | 33.0 | 200 |
| ³ Calcined magnesite (source E) | 45.5 | 63 |
| ³ Calcined magnesite (source F) | 46.00 | 32 |
| ³ Calcined magnesite (source G) | 51.5 | 17 |

² Sources A, B, C and D refer to four different samples of commercial magnesium oxide obtained from seawater bitterns, and produced by the use of quick-lime for the precipitation of magnesium therefrom.
³ Sources E, F and G refer to three different samples of commercial magnesite obtained through the calcining of mined magnesite.

Referring to this table, in which magnesium oxide is listed according to various types and sources, the comparison shown is based upon the respective weights of the samples used, and it will be noted that these range all the way from 16.1 lbs. per cu. ft. for U. S. P. light magnesium oxide to 51.5 lbs. per cu. ft. for calcined magnesite from "source C." Thus, we have practically pure magnesium oxide of a relatively light and fluffy nature at one end of the scale, while a relatively low grade of heavy weight and compactness is at the other end. In substantially the same ratio as that indicated by their respective weights, the several types of magnesium oxide are efficient when used in the present process, the purer and lighter weight forms producing the highest efficiency, while the least pure relatively heavy forms are similarly least efficient. However, as the cost of magnesium oxide is to a large degree a controlling factor in the treatment of water for silica removal for industrial purposes, it is not generally considered commercially feasible to use the U. S. P. light magnesium oxide because of its relatively high cost, especially when the so-called commercial and but slightly less pure magnesia is considerably less expensive, and operates with almost exactly the same degree of efficiency.

The relative values of various forms of magnesium oxide for silica removal is also generally indicated by the degree of turbidity, while this characteristic also offers a means for comparing magnesia obtained from similar sources. For example, the measurement of turbidity, as indicated in Table V, enables one to determine that form of magnesia best suited for this work from similar as well as from different means of manufacture. Turbidity determinations as here illustrated are measured on a 0.025% solution of magnesia with distilled water, after stirring and permitting two minutes time to elapse for settling. The results are expressed on the standard scale for measurement of turbidity as $SiO_2$ in P. P. M. Adsorptive properties are known to increase with the degree of particle subdivision, therefore, with a smaller particle size and consequently greater turbidity, as measured above, one can expect greater adsorptive properties generally in the removal of dissolved silica from the solution.

COMPARATIVE DATA ON COMMERCIAL FACTORS INVOLVED

TABLE VI

|  | Raw water | Test 1 | Test 2 | Test 3 | Test 4 | Test 5 | Test 6 |
|---|---|---|---|---|---|---|---|
| Hardness as $CaCO_3$ p. p. m | 74 | 96 | 66 | 60 | 16 | 360 | 64 |
| Sulfate as $SO_4$ p. p. m | 4 | 4 | 4 | 4 | 490 | 496 | 32 |
| P alkalinity as $CaCO_3$ p. p. m | 0 | 26 | 20 | 30 | 78 | 26 | 4 |
| M alkalinity as $CaCO_3$ p. p. m | 70 | 110 | 72 | 78 | 182 | 110 | 92 |
| pH | 7.1 | 9.2 | 9.7 | 9.8 | 10.0 | 8.9 | 9.0 |
| Silica as $SiO_2$ p. p. m | 56 | 2.5 | 2.5 | 3.0 | 1.0 | 2.5 | 16 |
| Magnesium oxide p. p. m |  | 300 | 300 | 300 |  |  |  |
| Sodium hydroxide p. p. m |  | 30 | 30 | 30 | 426 | 200 | 300 |
| Magnesium sulfate p. p. m |  |  |  |  | 800 | 800 |  |
| Ferric sulfate p. p. m |  |  |  |  |  |  | 460 |

Test 1—Using U. S. P. light magnesium oxide. Reaction and stirring time 15 minutes. Temp.—95° C.
Test 2—Using commercial magnesia (source A). Conditions as in test 1.
Test 3—Using commercial magnesia (source B). Conditions as in test 1.
Test 4—Using magnesium sulfate. Conditions as in test 1.
Test 5—Using magnesium sulfate. Conditions as in test 1.
Test 6—Using ferric sulfate. Retention and stirring time 60 minutes. Temp. 25° C.

Table VI has been prepared in order to graphically illustrate advantages possessed by the present magnesium oxide process, as compared with other processes, which to the uninitiated might appear to be closely allied therewith, if not actually the equivalent thereof. For all of the six tests run and indicated in this table, the same raw natural water was used and the characteristics of the same are first shown as characterizing a hardness as calcium carbonate of 74 P. P. M., of sulphate as 4 P. P. M. and silica as 56 P. P. M. In each of tests 1, 2, and 3, 300 P. P. M. magnesium oxide and 30 P. P. M. sodium hydroxide were used together, test 1 being with U. S. P. light magnesium oxide, while tests 2 and 3 were made by using commercial magnesia from sources A and B, respectively.

In test 1 the removal of silica was effected down to a residual amount represented by 2.5 P. P. M., while the hardness was increased to 96 P. P. M., and the total alkalinity increased from 70 P. P. M. to 110 P. P. M.

In test 2, the removal of silica was from the initial 56 P. P. M. to 3.0 P. P. M., while the hardness of the water dropped from its initial 74 P. P. M. to 60 P. P. M., and the total alkalinity increased only from the initial 70 P. P. M. to 78 P. P. M. In test 3, the removal of silica was from an initial 56 P. P. M. to 2.5 P. P. M., while the hardness of the water was decreased from the initial 74 P. P. M. to 66 P. P. M., which is substantially the same as that of test 2, while the total alkalinity was increased by only 2 P. P. M. from the initial 70 P. P. M. to 72 P. P. M.

Tests 4 and 5 were based upon the use of 800 P. P. M. of magnesium sulphate with 426 P. P. M. and 200 P. P. M. of sodium hydroxide, but without any magnesium oxide. It will be noted that the sulphate was increased from an initial 4 P. P. M. to the prohibitive quantity of 490 P. P. M. in test 4, and 496 P. P. M. in test 5, while in the last mentioned test the hardness jumped to the commercially impracticable figure of 360 P. P. M. Also, the initial total alkalinity of 70 P. P. M. was increased to 182 P. P. M. in test 4 and 110 P. P. M. in test 5. Thus, while an efficient silica removal was effected, especially in test 4, when it was reduced from the initial 56 P. P. M. to a mere 1.0 P. P. M., the pronounced increase in solids content, i. e., sulphates and alkalinity, makes the process represented by tests 4 and 5 of relatively minor commercial value, especially in the treatment of boiler feedwater, where such a marked increase in total solids and sulphates could not be tolerated.

Test 6 was run in order to show the comparison of using ferric sulphate (460 P. P. M.) with sodium hydroxide (300 P. P. M.) in lieu of either magnesium oxide or magnesium sulphate. The initial sulphate content was increased from 4 P. P. M. to 312 P. P. M., the total alkalinity increased from 70 P. P. M. to 92 P. P. M., and the silica reduced from the initial 56 P. P. M. only to 16 P. P. M., as compared with the much lower net remaining quantity of silica resulting from tests 1 to 5 inclusive, and in addition, even the results noted were attained only by a retention and stirring time of 60 minutes, as compared with 15 minutes for the first five of said tests. Furthermore, test 6 had to be conducted at the low temperature of 25° C., in order to obtain the results noted, as ferric sulphate cannot be effectively employed at high temperatures and, therefore, cannot be used in and concurrently with the operation of the hot lime-soda softening process, as is primarily desirable for the reasons hereinbefore pointed out. Thus, the process represented by test 6 could not be used on a commercial scale, especially as one great disadvantage involved in this process, aside from its relatively inefficient silica removal, is the pronounced increase in solids content of the water treated, due to the increase in sulphate above mentioned.

MECHANISM OF REACTION

From the chemical standpoint, it is interesting to note that the precipitation of silica from solutions by means of magnesium oxide is not a straight stoichiometric reaction, and this is no doubt one of the principal reasons why the present process has not been earlier discovered. In other words, the chemical reaction involved was unpredictable, especially as it depends upon several fairly critical factors, and does not definitely follow the line of previous experience and disclosures in the existing literature and patents on industrial water treatment. Thus, for example, the quantity of magnesium that is required to accomplish the removal of a given amount of silica is considerably above that which is stoichiometrically required for the formation of magnesium silicate. It is, therefore, quite possible that the silica removal is the result of the formation of a compound such as

Some of the data appears to indicate that the removal of silica from solution by means of magnesium oxide is in accordance with an adsorption reaction. It is true that one factor which opposes such a conclusion is the fact that the efficiency of the silica removal by this method is considerably greater at high temperatures than at low temperatures, whereas adsorption reactions are normally more efficient at low temperatures, as heat tends to reverse this action. However, a curve plotted in accordance with the accompanying tables to show the relationship between the silica remaining in solution and the silica removed per unit of magnesium oxide, has the general form of an adsorption curve. Thus, when plotting the data of Table I and using the logarithm of the silica remaining in solution, as related to the logarithm of the silica removed per unit of magnesium oxide employed, a straight line is obtained which points to the inescapable conclusion that a portion at least of this process is an adsorption reaction, since the straight line referred to comprises the general form of a Freundlich Adsorption Isotherm. Also, the data secured in plotting the residual silica against the silica removed per part of magnesium oxide employed checks closely with the form of a Langmuir Adsorption Isotherm.

The removal of silica by this process is further akin to typical adsorption reactions in that the quantity of magnesium oxide that must be employed is not in a constant ratio to the amount of silica initially present. As is typical of adsorption reactions, a greater quantity of magnesium oxide per unit of initial silica concentration is required where the initial silica concentration is low than is necessary where the initial silica concentration is relatively high. Whereas a ratio of approximately 2.4 parts or less of magnesium oxide per part of silica will effect efficient silica removal with initial relatively high silica concentrations of 80–120 P. P. M., a ratio of approximately 7.5 parts or more of magnesium oxide per part of silica is required with initial relatively low silica concentrations of 5–20 P. P. M. Of paramount importance is the fact that, in order to obtain effective removal of silica from solution by means of any magnesium salts, it is necessary that the precipitation of magnesium hydroxide be effected in situ.

USE OF MAGNESIUM CARBONATE

Magnesium carbonate can also be employed for the removal of silica from water, in which case the reaction proceeds quite similarly to that when using magnesium oxide. The magnesium carbonate can be used either in a dry form as the commercial material is usually purchased, or can be employed in a slurry form. However, there is an advantage in using magnesium carbonate in a slurry form, due to commercial magnesium carbonate frequently being relatively higher in price, and also the fact that it may be precipitated from any cheap magnesium salt to produce the slurry form, as for instance from magnesium chloride or magnesium sulphate with sodium carbonate as the precipitant. After the washing is completed, it is not necessary to dry this precipitate, but instead it may be permitted to remain in the slurry form, while this form of magnesium carbonate also offers the advantage of effecting a greater degree of silica removal than does magnesium carbonate in dry form, as indicated by the accompanying Table VII.

TABLE VII

| | P. P. M. |
|---|---|
| Analysis of original sample: | |
| Hardness as CaCO₃ | 136 |
| P alkalinity as CaCO₃ | 0 |
| M alkalinity as CaCO₃ | 24 |
| Silica as SiO₂ | 21 |

Conditions:
1.0 liter samples of water
15 minutes stirring and retention time
Temperature—95° C.
Magnesium carbonate added with lime and soda ash

LIME AND SODA TREATMENT
MAGNESIUM CARBONATE ADDED IN SLURRY FORM

| Grams, MgCO₃ on dry basis | Additional lime as CaO | Analysis of treated water | | | | Silica removal |
|---|---|---|---|---|---|---|
| | | Hardness as CaCO₃ | P alkalinity as CaCO₃ | M alkalinity as CaCO₃ | Silica remaining as SiO₂ | |
| | P.P.M. | P.P.M. | P.P.M. | P.P.M. | P.P.M. | P.P.M. |
| | | 40 | 32 | 92 | 18 | 3 |
| 0.1 | 67.5 | 24 | 24 | 102 | 6 | 15 |
| 0.2 | 135.0 | 24 | 24 | 100 | 4 | 17 |
| 0.3 | 202.5 | 18 | 50 | 88 | 3 | 18 |

(MAGNESIUM CARBONATE ADDED IN DRY FORM)

| 0.1 | 67.5 | 12 | 36 | 84 | 9 | 12 |
| 0.2 | 135.0 | 12 | 50 | 84 | 10 | 11 |
| 0.3 | 202.5 | 20 | 60 | 88 | 11 | 10 |

Thus, magnesium carbonate can be used in all of the applications in which magnesium oxide is of advantage in conjunction with the hot-process lime-soda water softening. However, although as before stated, magnesium carbonate serves in general as quite a satisfactory substitute for magnesium oxide in the removal of silica from solution, magnesium oxide in the forms shown in tests 2 and 3 of Table VI is somewhat more efficient (not mentioning test 1 of Table VI, due to the much higher cost of U. S. P. light magnesium oxide.) Also, when combining the hot lime-soda softening process with that of the removal of silica by means of magnesium oxide, it is not necessary to employ additional lime for a maintenance of the proper balance of lime-soda treated water. Also, the net cost of the process when using magnesium carbonate is slightly higher than that when using magnesium oxide.

SUMMARY

The net results of the research work, represented by the accompanying tables and the foregoing description, and considering all of the factors involved, is that silica is most economically removed from solution for industrial purposes, and especially in boiler water treatment, by the use of magnesium oxide in the form of the relatively purer and lighter weight forms of commercial magnesia; that this process functions best at high temperatures as for instance at approximately 95° C., and so is eminently well adapted for use concurrently with the lime-soda water softening process; that the magnesia process is best carried out with the addition of sodium hydroxide or its equivalent; and that fairly close approximation of the results thus obtained are similarly achieved by the use of the slightly less economical magnesium carbonate.

Having thus described our invention, what we claim as new and desire to protect by Letters Patent of the United States is:

1. The method of removing dissolved silica from natural water, which consists in heating the water to between 65° C. and the boiling point, and admixing therewith approximately 2.4 parts to 7.5 parts of light weight magnesium oxide per part of initial silica expressed as SiO₂ in the water, and sufficient sodium hydroxide to produce a total M alkalinity of the treated water between 20 P. P. M. and 100 P. P. M., and the P alkalinity being between 15% and 85% of the M alkalinity and then separating the precipitate from the water.

2. The method of removing dissolved silica from natural water, which consists in heating the water to the neighborhood of 95° C. and admixing therewith approximately 2.4 parts to 7.5 parts light weight, substantially pure magnesium oxide per part of initial silica expressed as SiO₂ in the water, and sufficient sodium hydroxide to produce a total M alkalinity of the treated water between 20 P. P. M. and 100 P. P. M., and the P alkalinity being between 15% and 85% of the M alkalinity and then separating the precipitate from the water.

3. The method of removing dissolved silica from natural water while in the hot lime-soda softening process, which consists in admixing therewith approximately 2.4 parts to 7.5 parts light weight magnesium oxide per part of initial silica expressed as SiO₂ in the water and then separating the precipitates from the water.

CHARLES A. NOLL.
JOHN J. MAGUIRE.